United States Patent Office 3,634,282
Patented Jan. 11, 1972

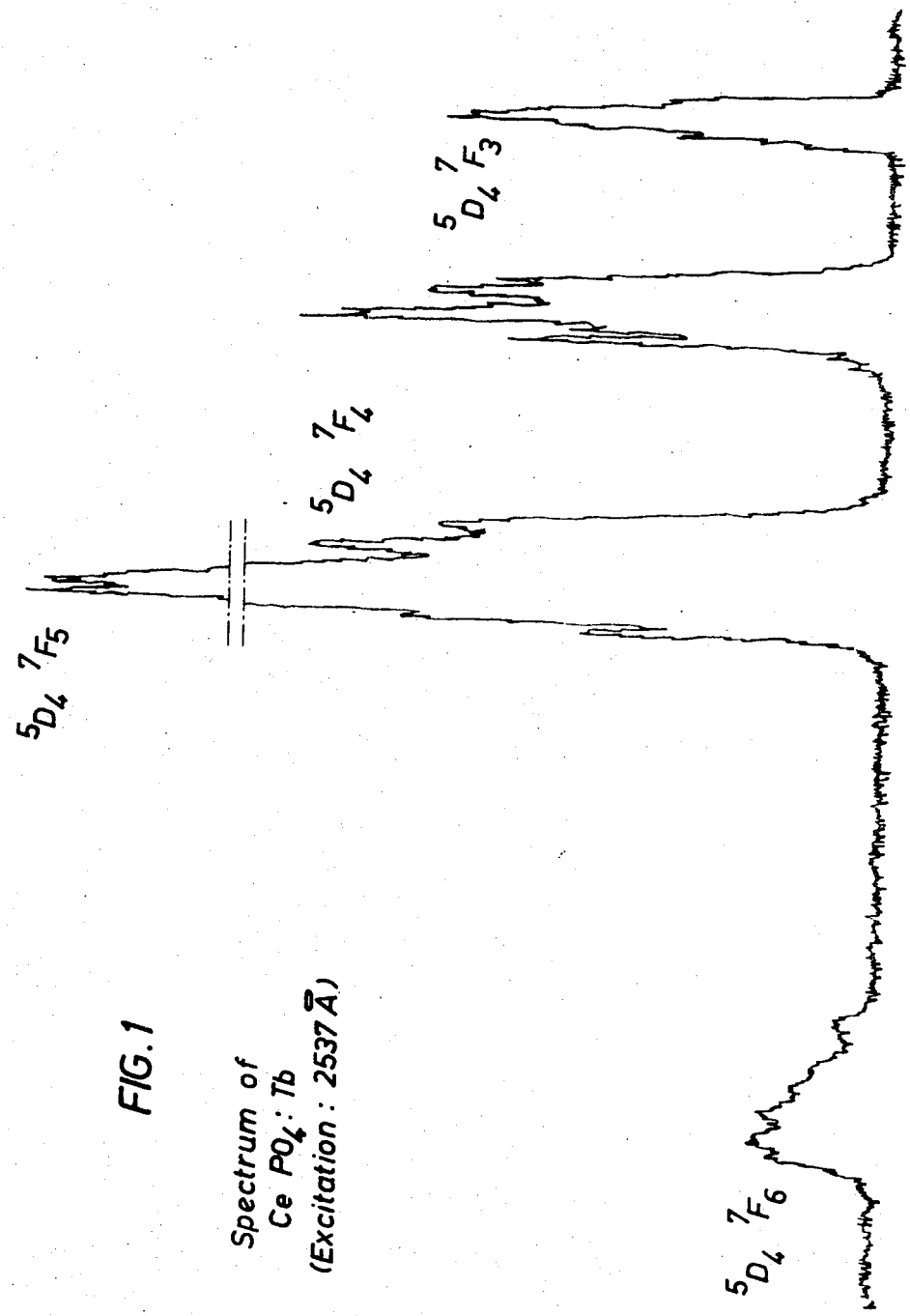

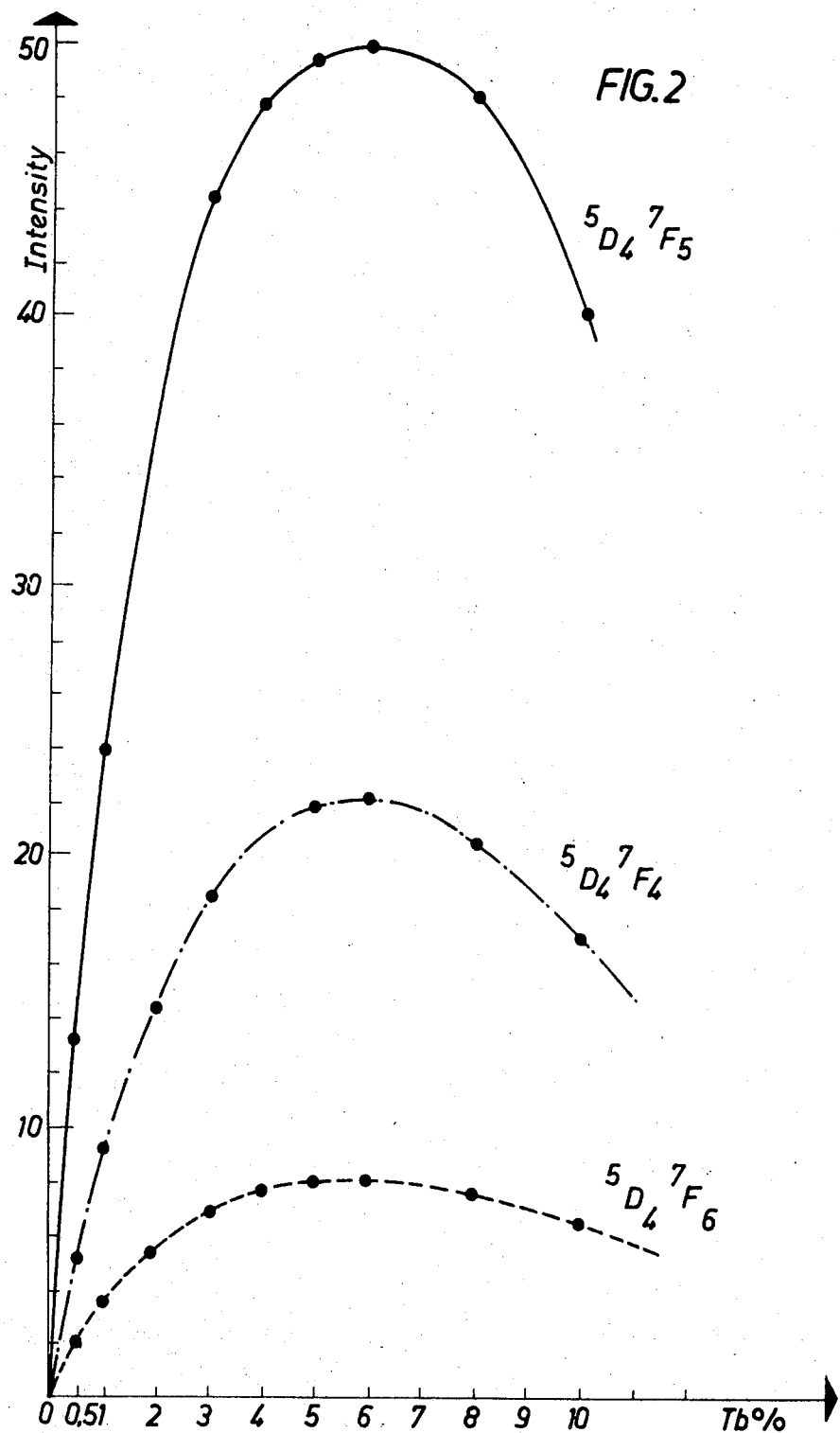

3,634,282
LUMINESCENT COMPOUNDS OF CERIUM PHOSPHATES ACTIVATED BY TERBIUM
Jean-Pierre Denis, Velizy-Villacoublay, and Jean Loriers, Meudon, France, assignors to Etablissement Public: Agence Nationale de Valorisation de la Recherche (Anvar), Puteaux, France
Filed Sept. 25, 1969, Ser. No. 861,027
Claims priority, application France, Sept. 26, 1968, 167,764
Int. Cl. C09k 1/36
U.S. Cl. 252—301.4 P
1 Claim

ABSTRACT OF THE DISCLOSURE

This invention relates to luminescent materials comprising compounds of rare-earth elements and belonging to the class of orthophosphates and containing terbium as an activating element. The invention also includes a method of preparing these materials, and further includes their applications, more particularly in the manufacture of television screens, cathode ray devices, radiation detectors and other devices making use of their properties of fluorescence and cathodoluminescence.

---

It is known that for some time certain materials comprising compounds of rare-earth elements have been used in the manufacture of the screens of colour television tubes, because of the excellent definition of their light emission in the range of the visible spectrum. Yttrium vanadate activated with europium, in particular, has been adopted as a red phosphor and has superseded the zinc-cadmium sulphides at first used for colour television. This improvement led to the desire to produce an improved green phosphor which could replace the sulphides used at present.

It is also known that such phosphors can be obtained by heating a mixture of oxides and/or salts with volatile anions with an ammonium phosphate, if a matrix with a phosphate base is required: see for example U.S. Pat. No. 3,322,681 and the article by W. A. McAllister in the Journal of the Electrotechnical Society, vol. 115, No. 5, May 1968, pages 535–538, which deals in particular with phosphates containing barium and lithium.

Another method of preparing phosphatic materials of this kind is described in French patent specification No. 1,323,921 (corresponding to U.S. Pat. No. 3,104,226). It effects the precipitation of the compounds in question by means of $(NH_4)_2HPO_4$.

It is known that the trivalent terbium ion possesses properties of cathodoluminescence, and in particular chromatic co-ordinates, which could be used with advantage if the $Tb^{+++}$ ion were introduced into a suitable matrix permitting sufficient intensity of emission to be obtained under cathodic excitation. This can be deduced, for example, from the work of Palilla ("The Trivalent Rare Earths in Inorganic Phosphor Systems," Technical Report TR 67-020.3, June 1967, G.T.&E. Lab). This author has described in particular the properties of terbium-activated yttrium phosphate of formula $YPO_4.Tb$, which has the same crystal structure as yttrium vanadate. It is likewise known that certain elements such as cerium or bismuth, when substituted in small amounts for yttrium as sensitizers, increase the intensity of emission of the activator $Tb^{+++}$ owing to an exciting-energy absorption and transfer mechanism. Indeed the trivalent cerium ion exhibits, in the short wavelength region, band of intense absorption, whereas the pure $YPO_4$ matrix is not very effective in this region. In principle, therefore, the introduction of cerium into the matrices carrying the emitting terbium would make possible a considerable gain in the fluorescence performance of the material.

In practice, however, the use of cerium in inorganic matrices prepared by calcination, e.g. vanadates, is liable to encounter the difficulty that $Ce^{+++}$ is converted into $Ce^{++++}$ in the course of the high-temperature treatment.

The present invention is based on the discovery that cerium phosphate $CePO_4$ can be prepared without the cerium being oxidized to the tetravalent state, so that a mineral matrix is available which is extremely favourable to fluorescent emission by the terbium ion. The cerium phosphate $CePO_4$ does not exhibit the orthorhombic or cubic structure of yttrium vanadate but the monoclinic structure characteristic of monazite (natural rare-earth phosphate). This latter structure appears to provide a matrix which is as favourable to the luminescence of terbium as is the orthorhombic or cubic structure for the luminescence of europium in $YVO_4$.

The invention also includes a method of preparing materials based on cerium phosphate but in which part of the cerium is replaced by a different trivalent element, or a mixture of elements, e.g. ½$Me^+$ and ½$Me^{++++}$, or ⅓$Me^+$ and ⅔$Me^{++++}$, where $Me^+$ represents a monovalent cation, $Me^{++}$ a bivalent cation and $Me^{++++}$ a tetravalent cation.

These phosphate matrices have, in general, the advantage of allowing terbium to be substituted for cerium without oxidation of $Tb^{+++}$ to $Tb^{++++}$ and with no limitation as to the concentration of activating terbium.

The luminescent materials of the present invention are thus constituted essentially on the one hand by a substantially colourless mineral matrix with the composition of a trivalent cerium orthophosphate or an orthophosphate in which part of the cerium is replaced by another trivalent element, e.g. lanthanum, gadolinium or bismuth, or by a group of elements equivalent to a trivalent element and selected from the monovalent elements sodium and potassium, the bivalent elements calcium, strontium, barium and magnesium, and the tetravalent elements thorium and zirconium, and on the other hand by a minor quantity of trivalent terbium introduced in place of cerium as an activating element exhibiting a green luminescence under the influence of cathode rays or other exciting radiation, e.g. ultraviolet rays.

The invention also includes luminescent materials prepared by the association or the mixing of the above-mentioned luminescent materials with other luminescent products, and it further includes manufactured articles wherein the fluorescent compounds of the present invention are incorporated or associated, alone or in admixture with other materials, in or with other constituents, e.g. binders, protective coatings or casings which permit the passage of incident or emitted radiations, supporting films, sheets and metallic deposits, plates, grids, and wires.

The luminescent materials of the present invention can be represented by the following general Formula I:

(I) $Ce_{(1-\epsilon-x)}Tb_\epsilon Me_a^+ Me_b^{++} Me_c^{+++} Me_d^{++++} PO_4$ where $Me^+$ represents a monovalent ion, e.g. sodium or potassium, $Me^{++}$ a divalent ion, e.g. calcium, strontium, barium or magnesium, $Me^{+++}$ a trivalent ion, e.g. lanthanum, gadolinium or bismuth, and $Me^{++++}$ a tetravalent ion, e.g. thorium or zirconium, the coefficients $a$, $b$, $c$, $d$ being less than 1 and being related by the equations and the inequality:

$$a+b+c+d=x<1-\epsilon \text{ and } a+2b+3c+4d=3x$$

and where the number $\epsilon$ of terbium atoms is substantially within the range 0.001 to 0.3 and is preferably substantially within the range 0.01 to 0.10.

The Formula I given above represents compounds according to the invention which contain both cerium and monovalent, bivalent and tetravalent substituting elements.

The specific luminescent materials of the present invention include the following:

(II) 

(III) 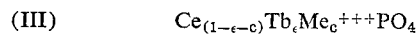

where $\epsilon$ and $c$ have the same meaning as before.

Of the above-mentioned materials, those comprising simply cerium phosphate activated with terbium (II), and those which, in addition to lanthanum, contain calcium, strontium, sodium or thorium, are preferred.

The coefficient $\epsilon$ which denotes the number of atoms of trivalent luminogenous terbium can lie between 0.001 and 0.300 approximately but lies preferably between 0.01 and 0.10, as indicated above.

The materials of the present invention can be prepared by the usual techniques comprising mixing oxides and/or salts of the elements in question and treating the mixture at sufficiently high temperatures to bring about phosphate formation. It is advantageous to use, e.g. for preparing the compound $CePO_4 \cdot Tb$, an ammonium phosphate such as $(NH_4)_2HPO_4$ or $(NH_4)_3PO_4$, this being mixed in suitable proportions with a trivalent cerium salt with a volatile anion, e.g. cerous chloride or cerous nitrate, and terbium oxide or a terbium salt with a volatile anion. It is also possible to start with a mixture of an ammonium phosphate, cerium oxide $CeO_2$ and terbium oxide $Tb_4O_7$, because in all cases the heat treatment causes preliminary melting of the mixture with reduction, then maintenance of the cerium in the trivalent state. Heating, continued at a higher temperature, finally gives the anhydrous orthophosphate. The calcination temperature must be at least of the order of 750° C.–800° C. and the optimal temperature lies between 1100° C. and 1200° C.

Preparation of materials containing, besides cerium, the above-mentioned mono-, bi-, tri- or tetravalent elements can be carried out in a similar maner, but the optimal temperature for preparation must be determined in each case in relation to the composition of the luminescent material it is required to obtain.

In general, the cations to be associated with the anionic radical $PO_4^{---}$ can be introduced into the mixture in the form of inorganic or organic oxides or salts decomposable under heat, e.g. nitrates, chlorides, carbonates, oxalates, acetates, and so forth. Readily decomposable oxalates of cerium and terbium give good results generally, from this point of view. In addition they have the advantage of allowing co-precipitation of the constituents of the matrix and the activator (Ce, La, Tb and so forth) and thus of effecting the elimination of any impurities which these constituents might contain.

The phosphate anion can also be introduced in the form of phosphoric anhydride, or even phosphoric acid, but ammonium phosphates are preferable.

An interesting variant of the above method of preparation consists in effecting the precipitation of the phosphate by treating a solution of chlorides or nitrates of cerium, terbium and any other cations to be included in the luminescent material with a concentrated solution of ammonium phosphate or even an alkali metal phosphate. The operation is preferably carried out in the warm state in acid conditions, and the precipitated phosphate can easily be washed and separated by filtration. It is dried in the oven, and then subjected to treatment at high temperature to render the compound crystalline.

The quality of the luminescent materials can be checked by examining their structure by X-ray diffraction. The powder patterns obtained from materials prepared under favourable conditions are compatible with a monoclinic structure corresponding with that of monazite. Hence these spectra provide a useful means for the identification of the luminescent material as defined by the above formula.

It should be noted, however, that even if the X-ray patterns should reveal the presence of a product of constituents corresponding with slight deviations from the theoretical formula, such a product will nevertheless fall within the scope of the present invention inasmuch as the essential characteristic of the material is not chemical purity but luminescence.

The study of the luminescent spectra of the various phosphates described herein and corresponding to the three formulae given above can be carried out by the customary spectroscopic methods. These methods comprise, on the one hand, qualitative examinations, and, on the other hand, more fundamental studies relating to the spectra of luminescence lines and measurement of the intensity of emission under well-defined excitation conditions.

Qualitative examination has been carried out by observing the luminescence of luminescent powders fixed by adhesion in a flat thin layer and subjected to exciting radiation, either in an apparatus generating cathode rays and provided with an observation window, or in the luminous beam of an aultraviolet lamp emitting mainly in the region of 2537 A.U.

Under these conditions all the materials according to the present invention exhibit strong green luminescence characteristic of the trivalent terbium ion.

The luminescent spectra are generally the same for both methods of excitation, but since observation under ultraviolet excitation is more convenient in practice, this technique has been used for spectroscopic study. To this end the spectra have been photographed at the exit of a prism spectrograph marketed by Huet. FIG. 1 of the accompanying drawings shows, by way of example, the densitometer recording of the spectrum given by the compound $CePO_4Tb$ under ultraviolet excitation obtained with a short wavelength ultraviolet lamp (main emission at 2537 A.U.).

Four groups of principal lines can be distinguished, corresponding with the radiation emitted by $Tb^{+++}$ in electron transitions from the resonance level $5D_4$ to the different sub-levels of the base multiplet $7F_n$. The principal green emission, centered around 5400 A.U., corresponds to the transition $5D_4 \to 7F_5$.

The quality of the Tb luminescent emission in these phosphates is due to the low intensity of the red, yellow and blue emissions corresponding respectively with the transitions $5D_4 \to 7F_3$, $5D_4 \to 7F_4$ and $5D_4 \to 7F_6$.

The reltaive intensities of the emissions corresponding with these different transitions have been measured by means of a photomultiplier of the RCA 931 A type, in association with a monochromator (Physique Industrie, Desvigne type).

The main advantages of the luminescent materials according to the present invention are that they have a line emission spectrum which is better defined than the band spectrum of zinc-cadmium sulphide activated with silver, and that they are composed of constituents which are less troublesome in comparison with yttrium vanadate doped with europium, as used for the red colour in colour television. Moreover they have the advantage of being substances which are extremely stable chemically, so that they are much easier to use than many other luminescent materials, particularly in deposition techniques.

The following examples illustrate the invention.

EXAMPLE 1

A luminescent material of the formula $Ce_{0.94}Tb_{0.06}PO_4$ can be prepared as follows. 8.09 grams cerium oxide $CeO_2$ and 0.56 grams terbium oxide $Tb_4O_7$, both of a purity higher than 99.95%, are weighed out and mixed with 6.60 grams ammonium diphosphate $(NH_4)_2HPO_2$. Homogeneity is obtained preferably by crushing in an agate or porcelain mortar. The mixture is then subjected to a series of calcinations in a platinum capsule at increasing temperatures: 300° C. for ¼ hour, next 600° C. for ½ hour, and then 1150° C. for 1 hour. After each calcination the crushing process is repeated. The powder which is finally obtained is white and perfectly crystallized, the X-ray pattern showing no extra line as compared with the lines of the monoclinic structure of the monazite type.

When the product is irradiated with ultraviolet light (main emission around 2537 A.U.) or subjected to a stream of electrons, it exhibits a strong green luminescence, comparable in intensity to that emitted by zinc-cadmium sulphide activated with silver.

EXAMPLE 2

In order to study the variation in intensity of luminescence in relation to the terbium content, a series of compounds was prepared having the general formula:

$$Ce_{(1-\epsilon)}Tb_\epsilon PO_4$$

with values of $\epsilon$ equal to 0.005, 0.01, 0.02, 0.03, 0.04, 0.05, 0.06, 0.08 and 0.10. The method used here was that of coprecipitation by ammonium diphosphate from a solution of cerous nitrate and terbium nitrate. The cerium nitrate solution was prepared by dissolving 100 grams of cerium ammonium nitrate in 1 litre of distilled water and determining the cerium gravimetrically after calcination of the nitrate (0.500 grams of nitrate corresponding to 0.150 grams of $CeO_2$). The solution of terbium nitrate was prepared by dissolving 0.748 gram of terbium oxide $Tb_4O_7$ in nitric acid and adjusting to 200 ml., to obtain a solution containing 0.02 of a gram atom of terbium per litre. The two solutions were then mixed in the required proportions in accordance with the Table I shown below so as to obtain the different terbium concentrations shown.

TABLE I

| Percent terbium | Solution of cerium nitrate | | Solution of terbium nitrate | |
|---|---|---|---|---|
| | Volume (ml.) | $CeO_2$ (grams) | Volume (ml.) | $Tb_4O$ (grams) |
| 0.5 | 55.6 | 1.712 | 2.5 | 0.0093 |
| 1 | 55.3 | 1.704 | 5 | 0.0187 |
| 2 | 54.7 | 1.686 | 10 | 0.0378 |
| 3 | 54.05 | 1.669 | 15 | 0.0561 |
| 4 | 53.6 | 1.652 | 20 | 0.0756 |
| 5 | 53.0 | 1.635 | 25 | 0.0935 |
| 6 | 52.5 | 1.618 | 30 | 0.112 |
| 8 | 51.4 | 1.583 | 40 | 0.149 |
| 10 | 50.3 | 1.549 | 50 | 0.187 |

Precipitation of the phosphate was carried out with an acid pH around 1 by adding a saturated solution of ammonium diphosphate to the solution of the rare-earth nitrates, previously heated nearly to boiling. Once precipitation is completed, the precipitate is easily separated by decantation and filtration or drying on a Büchner. It is washed in water and then oven-dried. Its properties of luminescence are present even at this stage. To render the phosphate more crystalline, it is treated at a high temperature in air after being powdered and placed in a platinum capsule. The most suitable duration of the firing is approximately 1 hour for temperatures between 950° C. and 1150° C.

The series of luminescent materials obtained was examined in respect of cathodoluminescence, and under ultraviolet irradiation. The materials show the same behaviour in both cases; the variation in intensity of luminescence was followed by means of a photomultiplier together with a monochromator permitting the separate evaluation of the blue, green and yellow emissions corresponding respectively to the transitions $5D_4 \rightarrow 7F_6$, $5D_4 \rightarrow 7F_5$, $5D_4 \rightarrow 7F_4$ of the $Te^{+++}$ ion.

The red emission, occurring at the sensitivity limit of the photomultiplier, was not examined. FIG. 2 of the accompanying drawings represents the variations in intensity after the correction necessitated by the variation in spectral response of the photomultiplier. The maximum for luminescent intensity occurs at terbium contents around 0.05 to 0.06. The intensity values shown as ordinates in FIG. 2 are relative values, expressed in arbitrary units, one of the test results being taken, for comparison, as the reference unit; the test conditions were identical for all the samples.

EXAMPLE 3

A compound having the formula $CE_{1-\epsilon}Tb_\epsilon PO_4$, identical with that of Example 2, can be prepared by a hybrid technique comprising coprecipitating the rare-earth metals in the form of oxalates, and then calcining these oxalates with ammonium phosphate. Thus, to obtain the compound $Ce_{0.95}Tb_{0.05}PO_4$, 41.250 grams of cerous nitrate $$Ce(NO_3)_3 \cdot 6H_2O$$

are weighed out and dissolved in 300 ml. of water, and a nitric acid solution containing 0.934 gram of terbium oxide $Tb_4O_7$ is added. The mixture of rare earth metal compounds is precipitated in the hot state (80° C.) by the addition of a saturated solution of oxalic acid; after the precipitate has been washed and then stove-dried, the calculated quantity of ammonium diphosphate, viz. 13.197 grams, is added to the mixed oxalates. The mixture is rendered homogeneous in a crushing device for half an hour, then placed in a platinum crucible and calcined at 700° C. for 2 hours. Thereafter it is given two further crushings, these taking place one before and one after a one-hour calcination at 1000° C. To render crystallisation perfect, the product is brought to 1100° C. for 2 hours.

EXAMPLE 4

A series of compounds coresponding to the formula:

$$La_x Tb_\epsilon Ce_{(1-\epsilon-x)}PO_4$$

was prepared with a content of terbium $\epsilon$ equivalent to 0.04 and with increasing concentrations of lanthanum. The products were prepared by precipitation of phosphates, as in the previous example, starting from solutions of nitrates. The concentration of the solution of terbium was 14.92 grams of $Tb_4O_7$ per litre, that of lanthanum 32.584 grams of $La_2O_3$ per litre and that of cerium 34.424 grams of $CeO_2$ per litre. The solutions were mixed in the proportions shown in Table II below.

TABLE II

| Formula | Percent $CeO_2$ | Lanthanum solution | | Cerium solution | | Terbium solution | |
|---|---|---|---|---|---|---|---|
| | | $La_2O_3$ (grams) | Volume (ml.) | $CeO_2$ (grams) | Volume (ml.) | $Tb_4O_7$ (grams) | Volume (ml.) |
| $La_{0.96}Tb_{0.04}PO_4$ | 0 | 3.128 | 96 | --- | --- | 0.1492 | 10 |
| $La_{0.92}Tb_{0.04}Ce_{0.04}PO_4$ | 4 | 3.000 | 92 | 0.1377 | 4 | 0.1492 | 10 |
| $La_{0.86}Tb_{0.04}Ce_{0.10}PO_4$ | 10 | 2.802 | 86 | 0.344 | 10 | 0.1492 | 10 |
| $La_{0.76}Tb_{0.04}Ce_{0.20}PO_4$ | 20 | 2.476 | 76 | 0.6885 | 20 | 0.1492 | 10 |
| $La_{0.56}Tb_{0.04}Ce_{0.40}PO_4$ | 40 | 1.824 | 56 | 1.377 | 40 | 0.1492 | 10 |
| $La_{0.36}Tb_{0.04}Ce_{0.60}PO_4$ | 60 | 1.173 | 36 | 2.0655 | 60 | 0.1492 | 10 |
| $La_{0.16}Tb_{0.04}Ce_{0.80}PO_4$ | 80 | 0.521 | 16 | 2.754 | 80 | 0.1492 | 10 |
| $Ce_{0.96}Tb_{0.04}PO_4$ | 96 | --- | --- | 3.304 | 96 | 0.1492 | 10 |

After precipitation by ammonium diphosphate and treatment at high temperature (1100° C.), the products exhibit properties of luminescence which are only faint in the case of the phosphate of lanthanum activated with terbium containing no cerium, but which then increase with the cerium content.

EXAMPLE 5

Two compounds based on calcium and thorium having the formulae $$Ca_{0.48}Th_{0.48}Tb_{0.04}PO_4$$

and $$Ca_{0.46}Th_{0.46}Ce_{0.04}Tb_{0.4}PO_4$$

were prepared by coprecipitation using solutions of calcium chloride and of thorium, cerium and terbium nitrates, these being titrated and mixed in the required proportions as in the two previous examples. The solutions, with a pH around 2.5, were heated to around 80° C., then precipitated by adding a slight excess of a saturated solution of $(NH_4)_2HPO_4$. After decantation, washing and stove-drying for 24 hours, the product containing cerium was already exhibiting a green luminescence, whereas the product with no cerium was inactive. After a two-hour heat-treatment at 1000° C. in air, both products exhibited ultra-violet fluorescence and cathodoluminescence, but the product containing cerium exhibited an intensity of emission which was much greater than for the product having as matrix the double phosphate $Ca_{0.5}Th_{0.5}PO_4$. This fact demonstrates the role of cerium in the energy absorption and transfer mechanism for the emitting ion $Tb^{+++}$. When examined by X-ray diffraction, the two products exhibit the monoclinic structure characteristic of the other phosphates in accordance with the present invention.

What is claimed is:

1. A composition of matter with green luminescence and cathode luminescence corresponding with the general formula $$Ce_{(1-\epsilon)}Tb_\epsilon PO_4$$

wherein $\epsilon$ is a number between 0.001 and 0.3.

References Cited

UNITED STATES PATENTS

| | | | |
|---|---|---|---|
| 3,211,666 | 10/1965 | McAllister | 252—301.4 P |
| 3,250,722 | 5/1966 | Borchardt | 252—301.4 P |
| 3,481,884 | 12/1969 | Palilla et al. | 252—301.4 P |
| 3,507,804 | 4/1970 | Ropp | 252—301.4 P |
| 3,525,698 | 8/1970 | Leto et al. | 252—301.4 P |

ROBERT D. EDMONDS, Primary Examiner